United States Patent
Tsai

(10) Patent No.: US 8,480,063 B2
(45) Date of Patent: Jul. 9, 2013

(54) WETTED WALL VENTURI SCRUBBER WITH A 2-STAGE VENTURI THROAT

(75) Inventor: Chuen-Jinn Tsai, Hsinchu County (TW)

(73) Assignee: National Chiao Tung University, Hsinchu (TW)

(*) Notice: Subject to any disclaimer, the term of this patent is extended or adjusted under 35 U.S.C. 154(b) by 473 days.

(21) Appl. No.: 12/662,899

(22) Filed: May 11, 2010

(65) Prior Publication Data
US 2011/0057335 A1 Mar. 10, 2011

(30) Foreign Application Priority Data
Sep. 7, 2009 (TW) .............................. 98130125 A

(51) Int. Cl.
*B01F 3/04* (2006.01)
(52) U.S. Cl.
USPC ......... 261/116; 261/DIG. 54; 96/275; 96/323
(58) Field of Classification Search
USPC .................... 261/115, 116, 117, 118, DIG. 9, 261/DIG. 54; 96/275, 323
See application file for complete search history.

(56) References Cited

U.S. PATENT DOCUMENTS

| | | | | |
|---|---|---|---|---|
| 3,085,793 A | * | 4/1963 | Pike et al. | 261/112.1 |
| 3,112,352 A | * | 11/1963 | Krantz | 261/36.1 |
| 3,131,237 A | * | 4/1964 | Collins, Jr. | 261/153 |
| 3,138,441 A | * | 6/1964 | Krantz | 96/245 |
| 3,142,548 A | * | 7/1964 | Krantz | 95/24 |
| 3,517,485 A | * | 6/1970 | Dell'Agnese et al. | 96/261 |
| 3,877,488 A | * | 4/1975 | Baturay et al. | 138/44 |
| 4,043,772 A | | 8/1977 | Lundy | |
| 4,210,428 A | * | 7/1980 | Schneider et al. | 96/275 |
| 4,578,226 A | * | 3/1986 | Adlhoch et al. | 261/71 |
| 5,061,408 A | * | 10/1991 | Huning et al. | 261/112.1 |
| 5,249,740 A | * | 10/1993 | Serra Tosio et al. | 236/44 A |
| 5,336,284 A | | 8/1994 | Schifftner | |
| 5,759,233 A | * | 6/1998 | Schwab | 95/8 |
| 6,719,829 B1 | | 4/2004 | Schwab | |
| 7,273,513 B2 | | 9/2007 | Linga et al. | |
| 2004/0207102 A1 | * | 10/2004 | Sugimori et al. | 261/112.1 |

OTHER PUBLICATIONS

Chuen-Jinn Tsai, Chia-Hung Lin, Yu-Min Wang, Cheng-Hsiung Hunag, Shou-Nan Li Zong-Xue Wu and Feng-Cai Wang, An Efficient Venturi Scrubber System to Remove Submicron . . . Mar. 2005.
Cheng-Hsiung Huang, Chuen-Jinn Tsai, and Yu-Min Wang, Control Efficiency of Submicron Particles by an Efficient Venturi Scrubber System, Journal of Environmental . . . Apr. 2007.

* cited by examiner

*Primary Examiner* — Charles Bushey
(74) *Attorney, Agent, or Firm* — Bacon & Thomas, PLLC

(57) ABSTRACT

A venturi scrubber which avoids clogging in the throat by dust particles is developed. The scrubber includes a venturi tube, two scrubbing fluid conduits and a storage tank. The venturi tube has a converging section, a diverging section and a throat section which is connected between the converging section and the diverging section. The scrubbing fluid conduit has a top end connected with the bottom end of the converging section of the venturi tube, and a bottom end extending into the storage tank. Thereby, scrubbing fluid can be guided directly into the storage tank without passing through the throat section. As a result, the clogging of dust particles on the converging section of the venturi throat can be minimized and the abnormal increase in the pressure drop of the air flow through the throat can also be avoided.

13 Claims, 7 Drawing Sheets

WETTED WALL VENTURI SCRUBBER WITH A 2-STAGE VENTURI THROAT

BACKGROUND OF THE INVENTION

1. Field of the Invention

The present invention relates to air pollution control equipment and more particularly, to a wetted wall venturi scrubber with a 2-stage venturi throat, which avoids clogging in the throat by dust particles.

2. Description of the Related Art

Venturi scrubbers have been extensively used in the removal of particles in the waste gas. A traditional venturi scrubber generally comprises a converging section, a diverging section and a throat. The throat is connected between the converging section and the diverging section. Waste gas and scrubbing fluid droplets are introduced into the converging section, and then accelerated in the throat section. The scrubbing fluid droplets collide with the particles due to the velocity difference between the particles and the droplets, thereby causing the particles to collide with the droplets by inertial impaction and are removed from the waste gas.

However, when waste gas of high particle concentration is introduced into the venturi scrubber, the particles tend to be adhered to the inner surface of the converging section and the throat. Accumulation of particles results in particle clogging in the scrubber, thereby causing operation instability and abnormal increase in the pressure drop of the air flow through the scrubber. Further, the traditional venturi scrubber has a special shape comprising converging section, throat and diverging section, which complicates the fabrication process.

In the paper by Tsai et al. (*J. Air & Waste Manage. Assoc.*, 55: 319-235, 2005) and Huang et al. (*J. Environ. Eng. ASCE*, 133(4): 454-461, 2007), the particle collection efficiency of a traditional venturi scrubber was enhanced by condensational growth of fine particles before the scrubber. But the method to avoid particle clogging in the throat areas had never been mentioned. Both U.S. Pat. Nos. 5,336,284 and 4,043,772 disclose a venturi scrubber with an area-adjustable throat section. The users can change the throat cross sectional area according to the operating conditions. To avoid particle clogging, the throat cross sectional area can be increased while high-concentration aerosol particles are treated by the scrubber. But it will lead to the reduction of collection efficiency.

SUMMARY OF THE INVENTION

It is the main objective of the present invention to provide a wetted wall venturi scrubber with a 2-stage venturi throat, which avoids clogging in the throat by dust particles.

Another objective of the present invention is to provide a wetted wall venturi scrubber with a 2-stage venturi throat, which reduces the manufacturing time, labor and cost.

To achieve these objectives, a wetted wall venturi scrubber designed with a 2-stage venturi throat comprises a venturi tube, a conduit and a storage tank. The venturi tube comprises a converging section, a diverging section and a throat connected between the converging section and the diverging section. The converging section comprises a gas inlet. The diverging section comprises a gas outlet. The conduit has its top end connected with the bottom side of the converging section. The storage tank is connected with the bottom end of the conduit. Further, the storage tank stores the scrubbing fluid. The bottom end of the conduit extends below the level of the scrubbing fluid in the storage tank. Further, the throat of the venturi tube has a top end extended to the inside of the converging section.

In one embodiment of the present invention, the wetted wall venturi scrubber further comprises an atomized sprayer mounted inside the converging section to form droplets which collect suspended particles in the throat by inertial impaction, and an overflow gutter connected with the converging section of the venturi tube to provide liquid flow that continuously washes off deposited particles in the converging section. The venturi tube and the conduit are formed of an outer component and an inner component. The converging section of the venturi tube and the conduit are formed in the outer component. The throat and the diverging section of the venturi tube are formed in the inner component. The outer component comprises a through hole for the insertion of one end of the inner component.

In another embodiment of the present invention, the venturi tube is formed of an outer component and an inner component. The converging section is formed in the outer component. The throat and the diverging section are formed in the inner component. The venturi tube further comprises a throat jacket sleeved onto the inner component and disposed inside the outer component. The throat jacket and the inner component define therebetween a scrubbing fluid inlet passage. The inner component of the venturi tube comprises a plurality of small holes on the wall of the throat. The holes are connected to the scrubbing fluid inlet passage. The inner component of the venturi tube comprises a rib extending around the periphery thereof and welded to a bottom side of the throat jacket. The conduit is connected with the outer component by a connecting member. The inner component is mounted inside the connecting member by a flange. The venturi tube comprises a wall-wetting fluid supply pipe connected with a top side of the converging section. The wall-wetting fluid supply pipe extends along the converging section in the tangential direction.

DETAILED DESCRIPTION OF THE INVENTION

Figure 1:
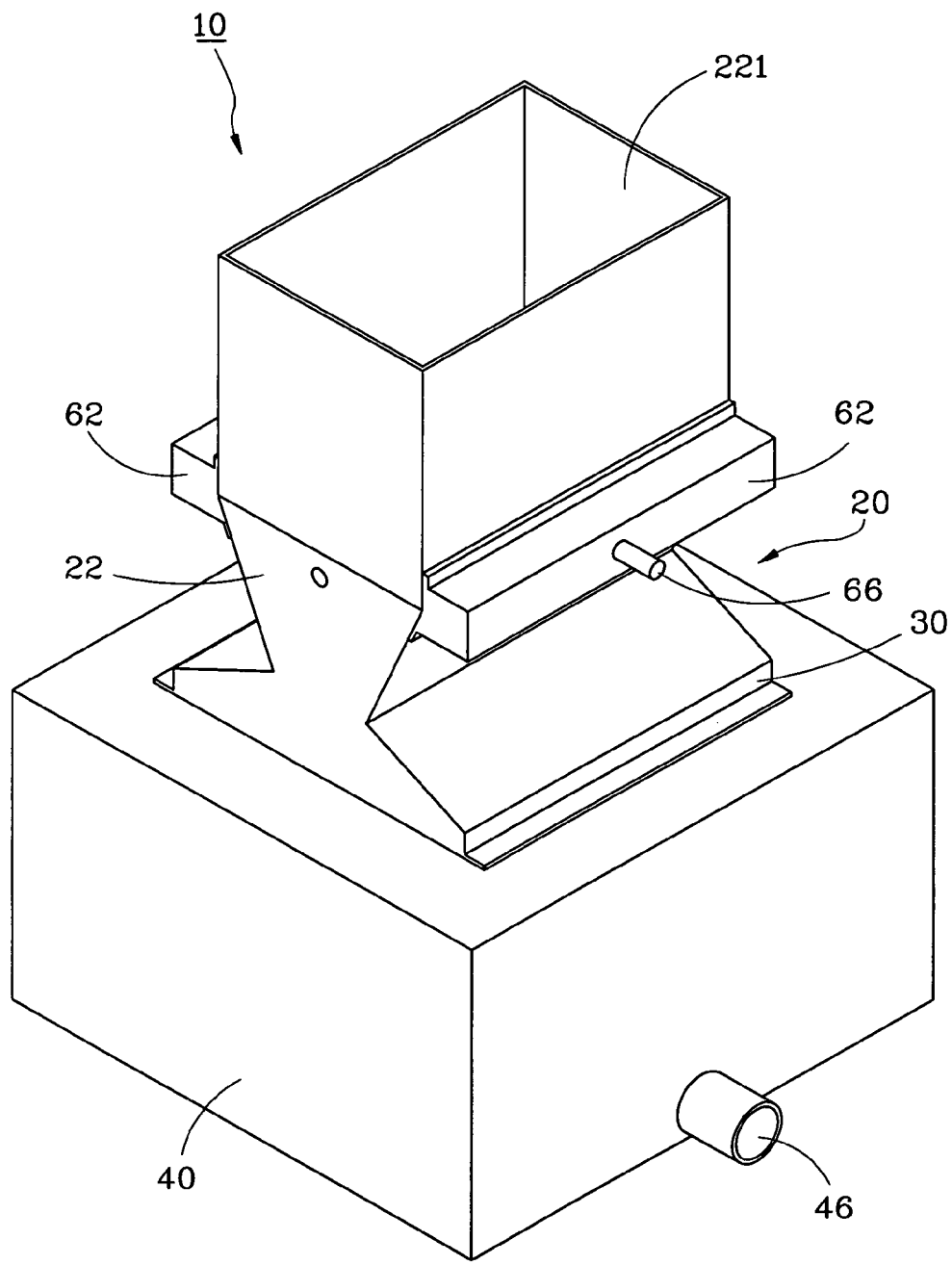
FIG. 1 is an isometric view of a wetted wall venturi scrubber with a 2-stage venturi throat in accordance with a first embodiment of the present invention.
Figure 2:
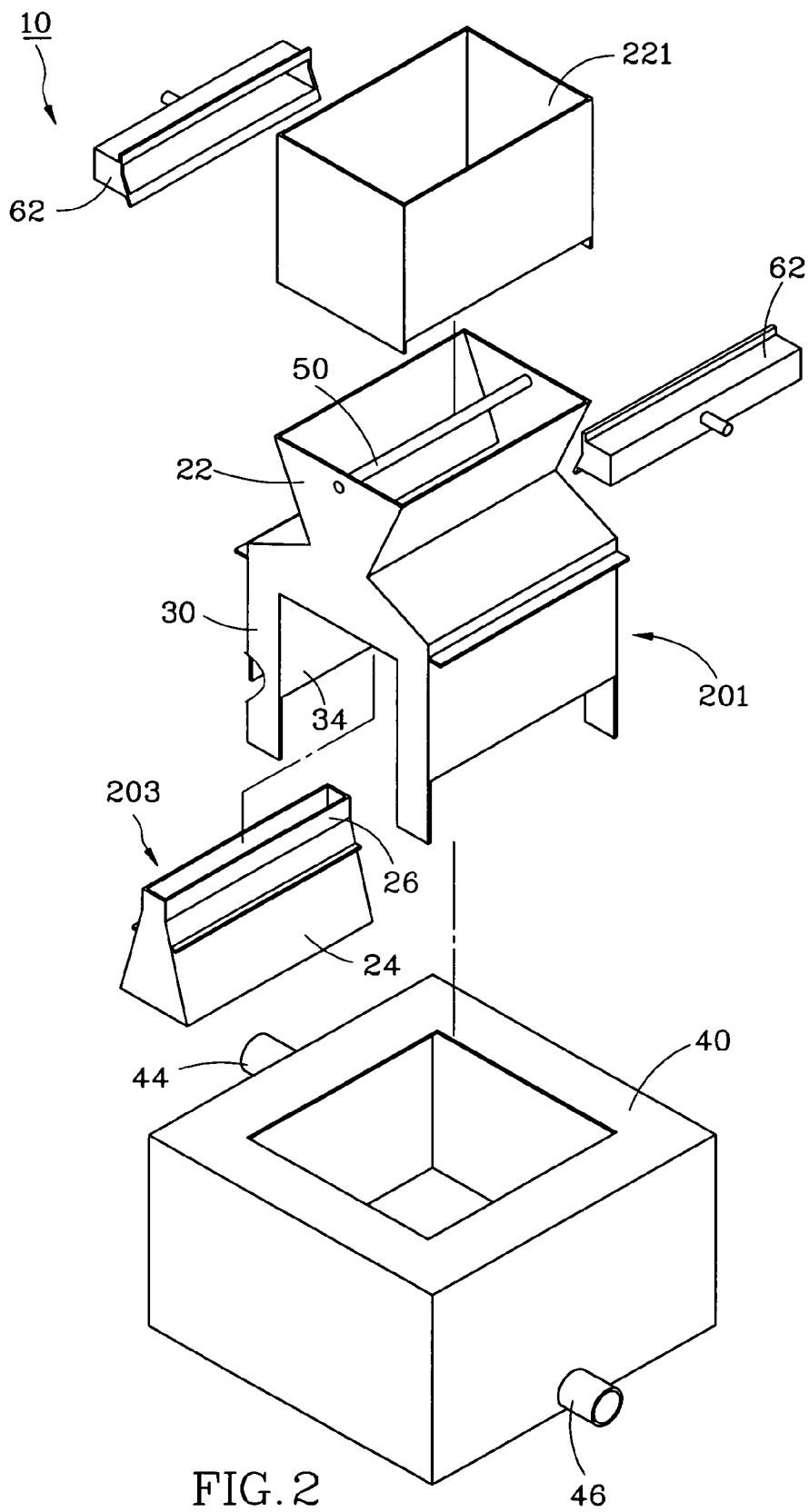
FIG. 2 is an exploded view of the wetted wall venturi scrubber with a 2-stage venturi throat in accordance with the first embodiment of the present invention.
Figure 3:
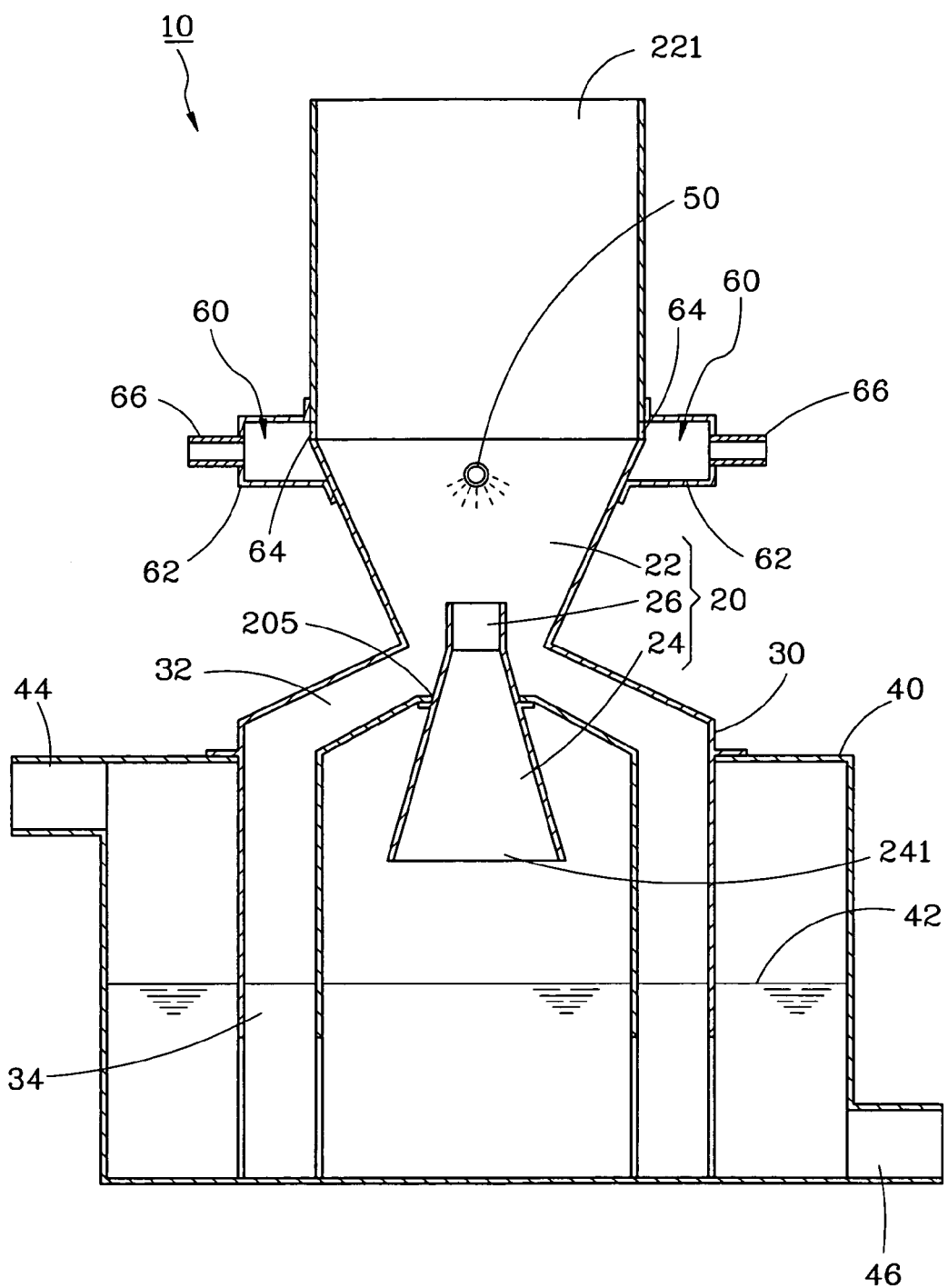
FIG. 3 is a sectional view of the wetted wall venturi scrubber with a 2-stage venturi throat in accordance with the first embodiment of the present invention.
Figure 4:
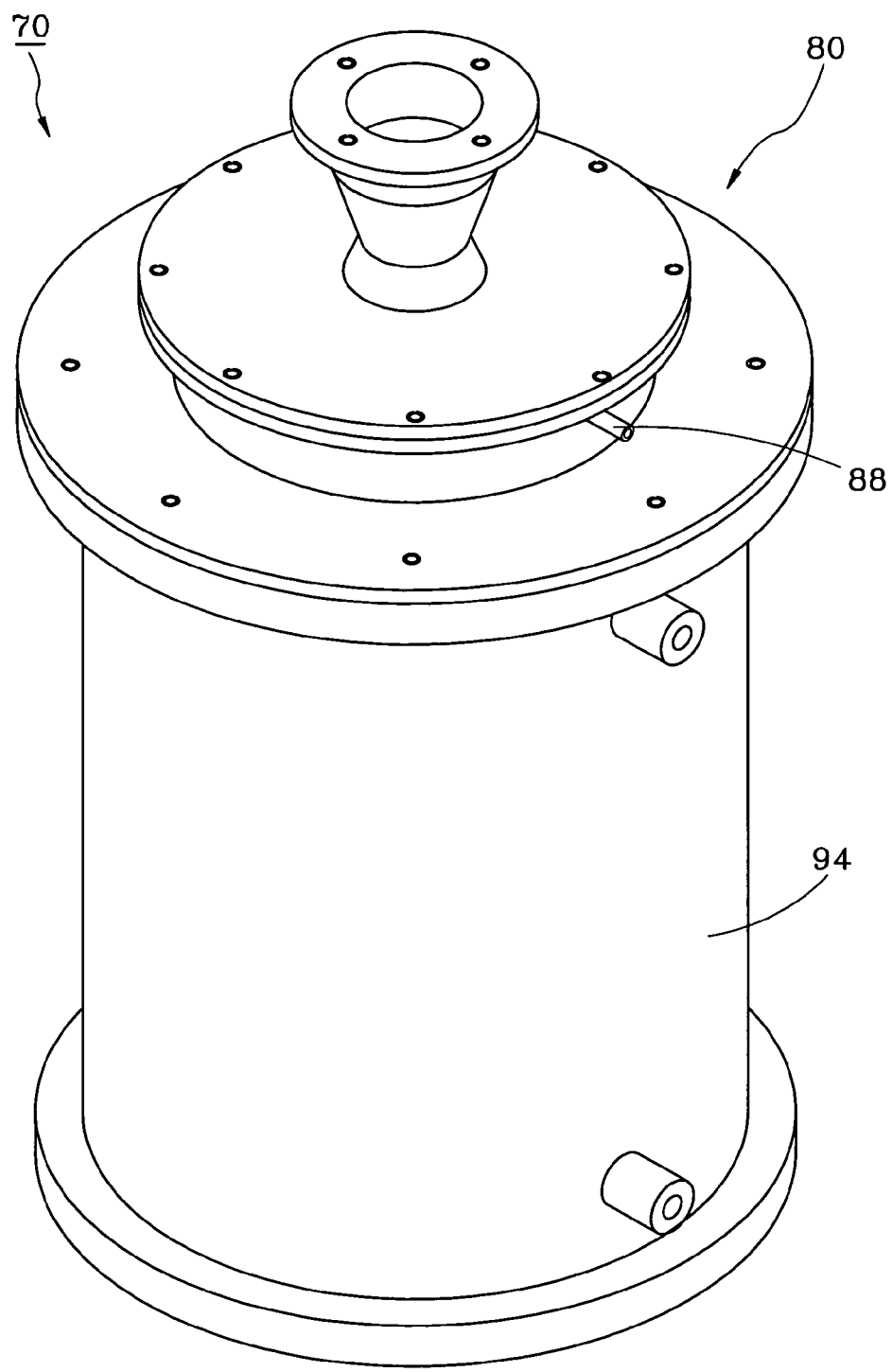
FIG. 4 is an isometric view of a wetted wall venturi scrubber with a 2-stage venturi throat in accordance with a second embodiment of the present invention.
Figure 5:
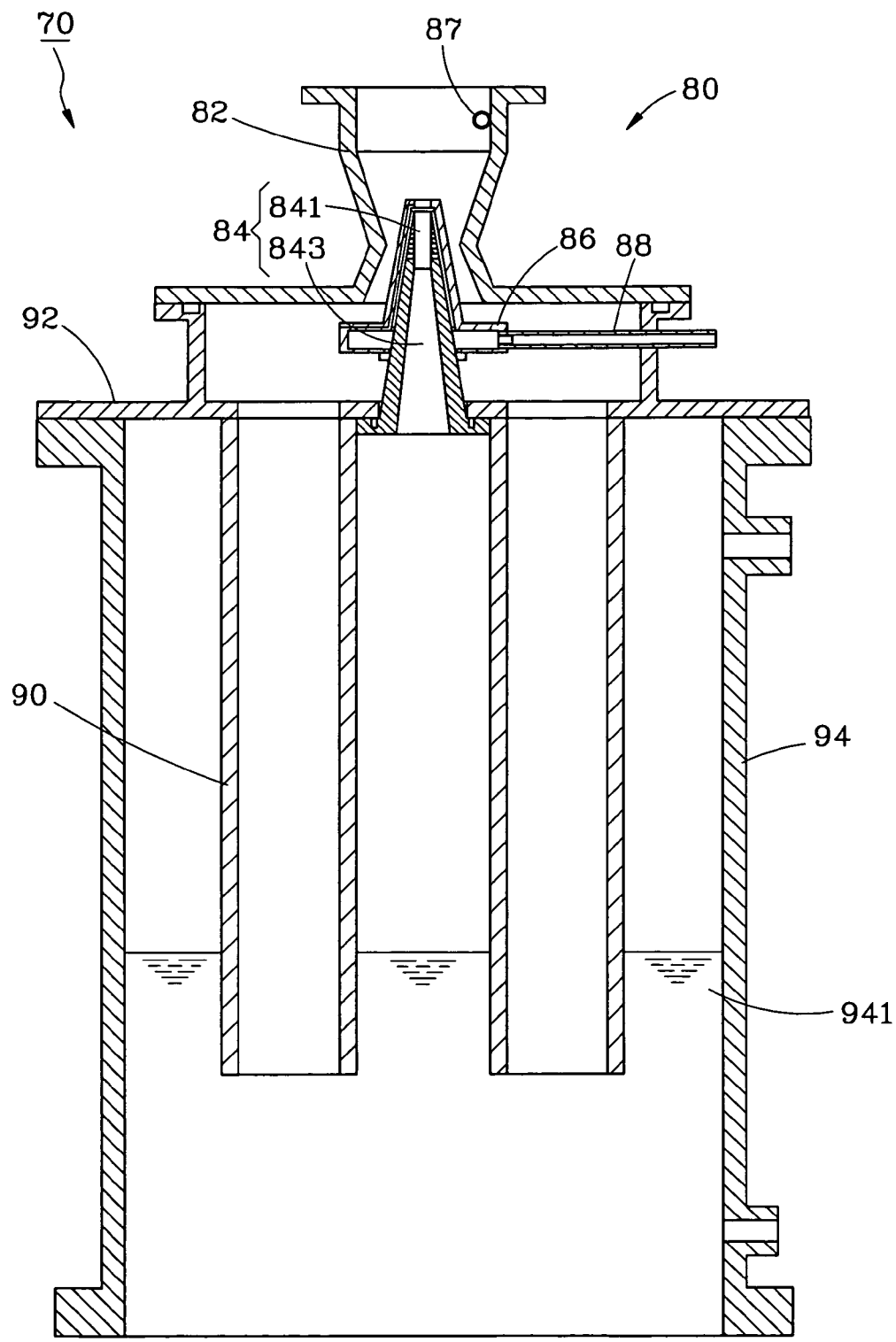
FIG. 5 is a sectional view of the wetted wall venturi scrubber with a 2-stage venturi throat in accordance with the second embodiment of the present invention.
Figure 6:
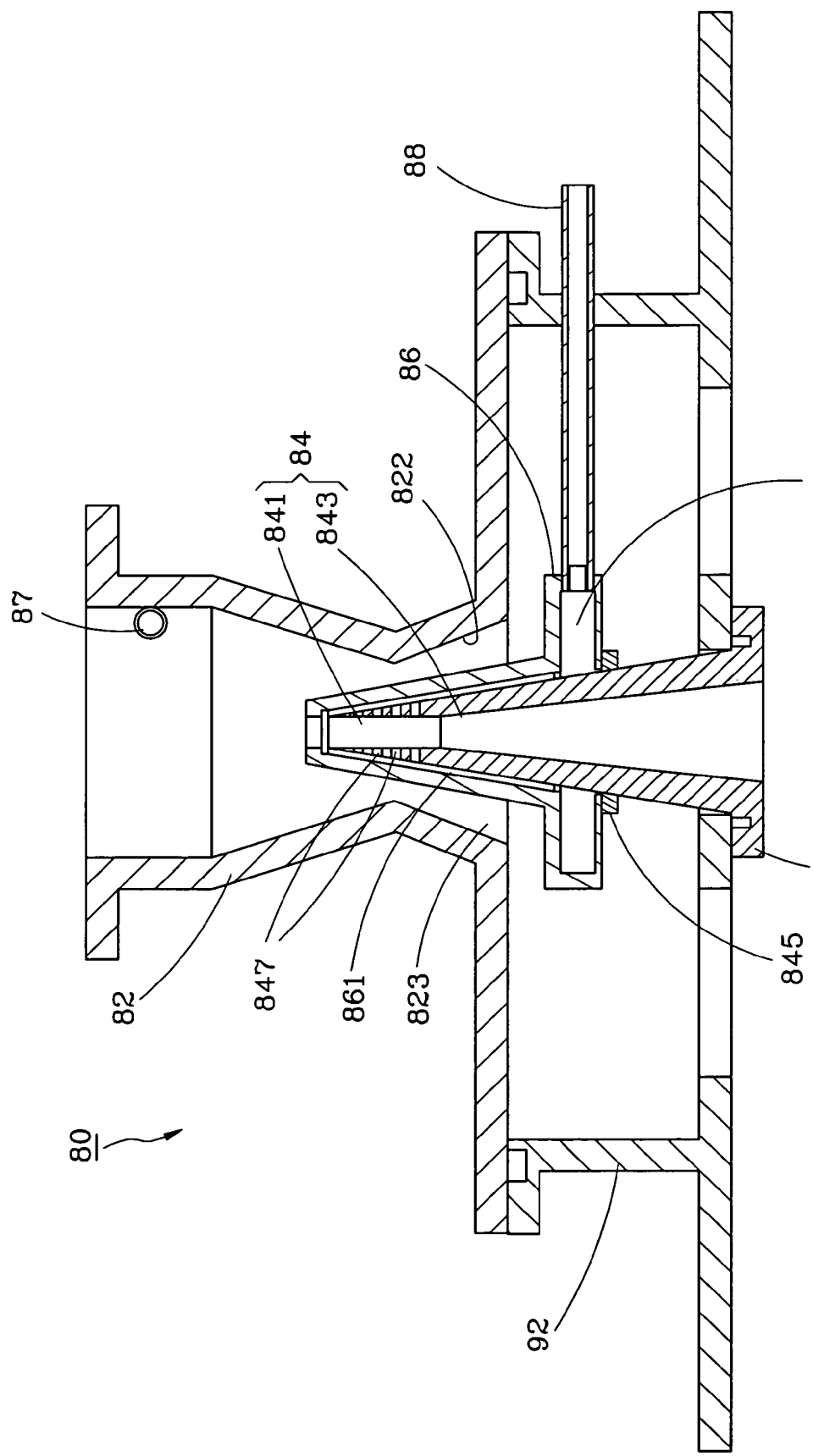
FIG. 6 is a sectional view of the venturi tube of the wetted wall venturi scrubber with a 2-stage venturi throat in accordance with the second embodiment of the present invention.
Figure 7:
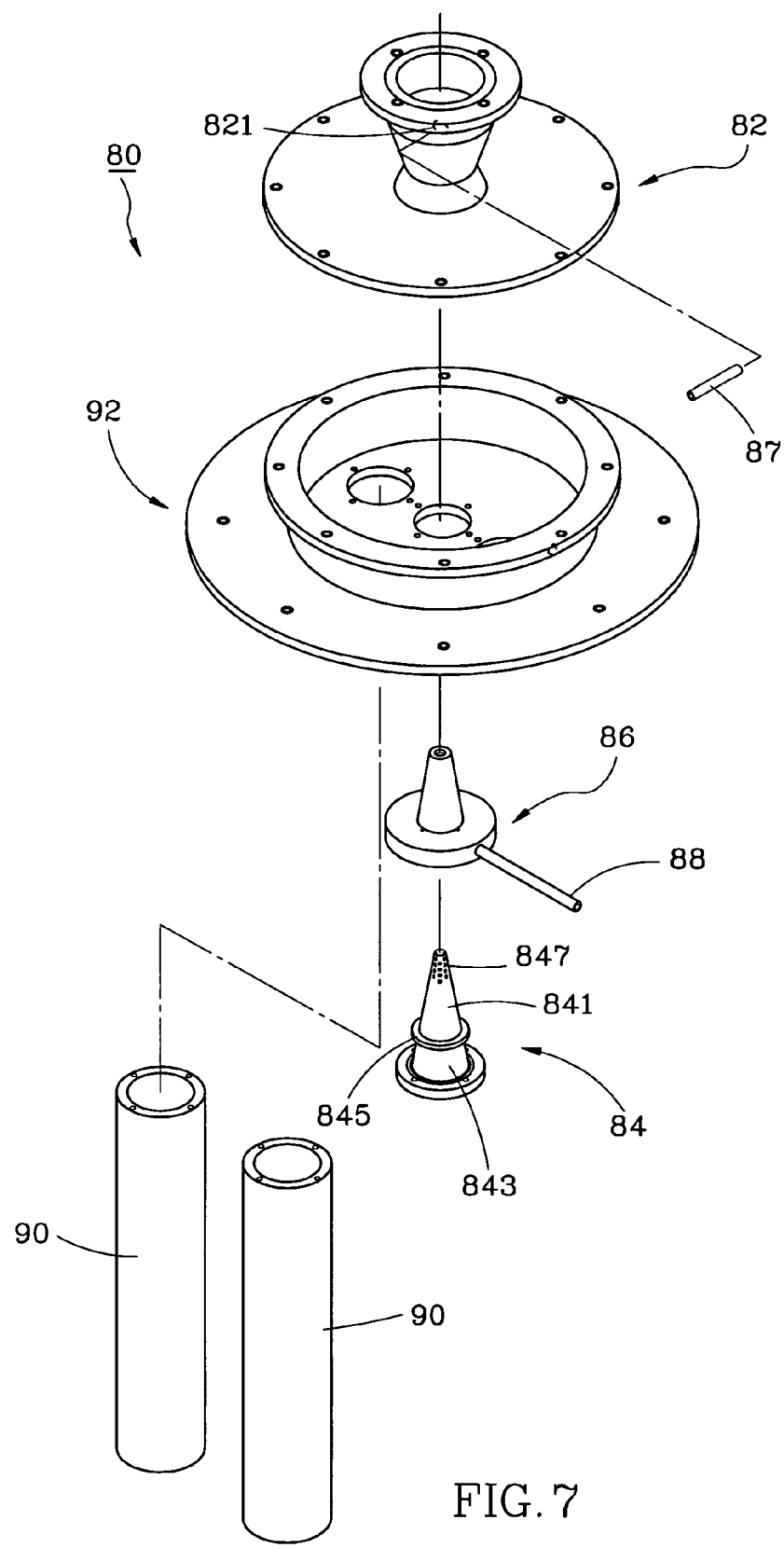
FIG. 7 is an exploded view of the venturi tube and conduits of the venturi tube of the wetted wall venturi scrubber with a 2-stage venturi throat in accordance with the second embodiment of the present invention.

Referring to FIGS. 1~3, a wetted wall venturi scrubber with a 2-stage venturi throat 10 in accordance with a first embodiment of the present invention comprises a venturi tube 20, two scrubbing fluid conduits 30, a storage tank 40, an atomized sprayer 50 and two overflow gutters 60.

The venturi tube 20 comprises a converging section 22, a diverging section 24 and a throat 26. The throat 26 is connected between the converging section 22 and the diverging section 24 with its top end extended to the inside of the converging section 22. The converging section 22 has a gas inlet 221 at its entry. The diverging section 24 has a gas outlet 241 formed in its one end remote from the throat 26.

The two scrubbing fluid conduits 30 each have a top end 32 connected with the bottom side of the converging section 22 of the venturi tube 20, and a bottom end 34 connected with the storage tank 40.

The venturi tube 20 and the two scrubbing fluid conduits 30 are formed of an outer component 201 and an inner component 203. The converging section 22 of the venturi tube 20 and the two scrubbing fluid conduits 30 are formed in the outer component 201. The throat 26 and diverging section 24 of the venturi tube 20 are formed in the inner component 203. The outer component 201 has a through hole 205 for the insertion of the top end of the inner component 203.

The storage tank 40 is connected with the bottom side of the outer component 201 to collect the scrubbing fluid. The bottom end 34 of two scrubbing fluid conduits 30 extend below the fluid level of the scrubbing fluid, avoiding the waste gas directly passing through the two scrubbing fluid conduits 30 without scrubbing. The inside space of the storage tank 40 is in communication with the gas outlet 241 of the diverging section 24. The storage tank 40 has an exhaust hole 44 and a scrubbing fluid outlet 46 respectively disposed in the top and bottom sides.

The atomized sprayer 50 is mounted inside the converging section 22 of the venturi tube 20 to spray fine droplets of scrubbing fluid.

The two overflow gutters 60 are formed by affixing two connectors 62 to the outside of the converging section 22, each being in communication with the inside of the converging section 22 of the venturi tube 20 through an opening 64 on the converging section 22.

The scrubbing fluid of the wetted wall venturi scrubber 10 is capable of washing particles from the waste gas directly and wetting the inner surface of the venturi tube 20. The scrubbing fluid for washing particles is introduced into the venturi tube 20 through the atomized sprayer 50. When the waste gas to be treated is guided through the gas inlet 221 into the converging section 22, the fine droplets of scrubbing fluid generated by the atomized sprayer 50 is mixed with the waste gas to flow into the throat 26. The fine droplets of scrubbing fluid collide with the particles in the waste gas, thereby causing dust particles to be removed from the waste gas. The purified gas is discharged through the exhaust hole 44 to the outside. After passing through the throat 26 and diverging section 24 of the venturi tube 20, the scrubbing fluid flows into the storage tank 40.

Further, the scrubbing fluid for wetting the inner surface of the venturi tube 20 is provided by the storage tank 40. The scrubbing fluid is guided through a circulating piping (not shown) and two wall-wetting fluid supply pipes 66 to the two overflow gutters 60, and then flows into the converging section 22 of the venturi tube 20 to wet its inside wall, avoiding adhesion and accumulation of dust particles. The overflowing scrubbing fluid then flows along the scrubbing fluid conduits 30 back to the storage tank 40.

The scrubbing fluid for wetting the inside wall of the converging section 22 is directly guided back to the storage tank 40 by the scrubbing fluid conduits 30, reducing the amount of scrubbing fluid passing through the throat 26. It is helpful to avoids clogging in the throat 26 resulting from an over amount of the scrubbing fluid passing through the throat 26.

As stated above, the venturi tube 20 and the two scrubbing fluid conduits 30 are formed by assembling an outer component 201 with an inner component 203. So far as the configuration is concerned, the outer component 201 and the inner component 203 can be made much easier than a conventional venturi tube, decreasing much manufacturing time, labor and cost. Further, the top end of the throat 26 of the venturi tube 20 extends to the inside of the converging section 22, facilitating the scrubbing fluid to flow into the scrubbing fluid conduits 30.

Based on the spirit of the present invention, the structure of the venturi tube may be variously embodied. FIGS. 4~7 illustrate a wetted wall venturi scrubber with a 2-stage venturi throat 70 in accordance with a second embodiment of the present invention. Substantially similar to the aforesaid first embodiment, the wetted wall venturi scrubber with a 2-stage venturi throat 70 in accordance with this second embodiment comprises a venturi tube 80, two scrubbing fluid conduits 90 and a storage tank 94.

The venturi tube 80 is formed by connecting an outer component 82, an inner component 84, a throat jacket 86, a wall-wetting fluid supply pipe 87 and a dust particle scrubbing fluid supply pipe 88 with one another. The outer component 82 is a cylindrical tube defining a converging section 82. Further, the outer component 82 has a hole 821 near the top side of the converging section 82 for the insertion of the wall-wetting fluid supply pipe 87. The wall-wetting fluid supply pipe 87 extends along the tangential direction so that the scrubbing fluid flows spirally along the inner surface of the converging section 82. The outer component 82 further has a through hole 822 on the bottom side for the insertion of the inner component 84. The inner component 84 defines a throat 841 and a diverging section 843. Further, the inner component 84 has a rib 845 extending around the periphery. The throat 841 has a plurality of small radial holes 847. The throat jacket 86 is sleeved onto the inner component 84 and disposed inside the outer component 82, defining with the inner component 84 a scrubbing fluid inlet passage 861 that communicates with the outside through the dust particle scrubbing fluid supply pipe 88 and the inside of the inner component 84 through the small holes 847. The bottom side of the throat jacket 86 is welded to the rib 845 of the inner component 84.

The two scrubbing fluid conduits 90 are connected to the outer component 82 by a connecting member 92. The inner component 84 is fixedly mounted inside the connecting member 92 by a flange 848.

The scrubbing fluid 941 in the storage tank 94 is guided through a circulation piping (not shown) and the wall-wetting fluid supply pipe 87 into the converging section 82 of the venturi tube 80 to wet the inside wall of the converging section 82. Thereafter, the scrubbing fluid flows through a scrubbing fluid outlet passage 823 between the outer component 82 and the throat jacket 86 into the inside of the connecting member 92, and then through the scrubbing fluid conduits 90 into the storage tank 94. Further, the scrubbing fluid after purification is guided through the dust particle scrubbing fluid supply pipe 88, the scrubbing fluid inlet passage 861 and the small holes 847 into the throat 841 to wash dust particles from the waste gas.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A wetted wall venturi scrubber, comprising:
   a venturi tube, said venturi tube comprising a converging section, a diverging section and a throat connected between said converging section and said diverging section, said converging section comprising a gas inlet, said diverging section comprising a gas outlet;
   a conduit, said conduit having a top end connected with a bottom side of said converging section and a bottom end; and
   a storage tank connected with the bottom end of said conduit for storage of scrubbing fluid, the conduit being adapted to guide the scrubbing fluid from the venturi tube to the storage tank.

2. The wetted wall venturi scrubber as claimed in claim 1, wherein said storage tank stores a scrubbing fluid; the bottom end of said conduit extends below the level of said scrubbing fluid in said storage tank.

3. The wetted wall venturi scrubber as claimed in claim 1, further comprising an atomized sprayer mounted inside said converging section of said venturi tube.

4. The wetted wall venturi scrubber as claimed in claim 1, further comprising an overflow gutter connected with said converging section of said venturi tube.

5. The wetted wall venturi scrubber as claimed in claim 1, wherein said throat of said venturi tube has a top end extended to the inside of said converging section.

6. The wetted wall venturi scrubber as claimed in claim 1, wherein said venturi tube and said conduit are formed of an outer component and an inner component; said converging section of said venturi tube and said conduit are formed in said outer component; said throat and said diverging section of said venturi tube are formed in said inner component; said outer component comprises a through hole for the insertion of one end of said inner component.

7. The wetted wall venturi scrubber as claimed in claim 1, wherein said venturi tube is formed of an outer component and an inner component; said converging section is formed in said outer component; said throat and said diverging section are formed in said inner component; said outer component comprises a through hole for the insertion of one end of said inner component.

8. The wetted wall venturi scrubber as claimed in claim 7, wherein said venturi tube further comprises a throat jacket sleeved onto said inner component and disposed inside said outer component, said throat jacket and said inner component defining therebetween a scrubbing fluid inlet passage.

9. The wetted wall venturi scrubber as claimed in claim 8, wherein said inner component of said venturi tube comprises a plurality of small holes on the wall of the throat and connected to said scrubbing fluid inlet passage.

10. The wetted wall venturi scrubber as claimed in claim 8, wherein said inner component of said venturi tube comprises a rib extending around the periphery thereof and welded to a bottom side of said throat jacket.

11. The wetted wall venturi scrubber as claimed in claim 7, wherein said conduit is connected with said outer component by a connecting member.

12. The wetted wall venturi scrubber as claimed in claim 11, wherein said inner component is mounted inside said connecting member by a flange.

13. The wetted wall venturi scrubber as claimed in claim 1, wherein said venturi tube comprises a wall-wetting fluid supply pipe connected with a top side of said converging section, said wall-wetting fluid supply pipe extending along said converging section in the tangential direction.

* * * * *